Nov. 9, 1965    H. G. COLMER, JR    3,216,273
POWER TRANSMITTING MEANS
Filed May 8, 1963
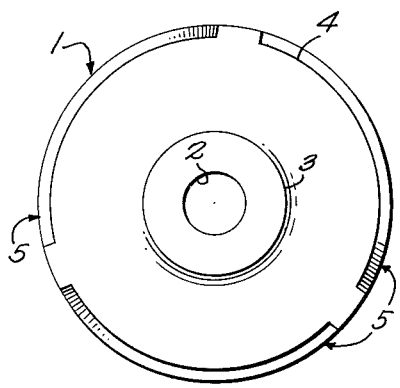
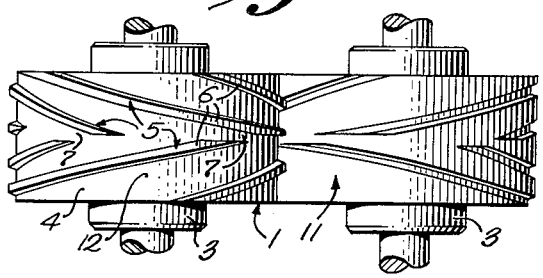
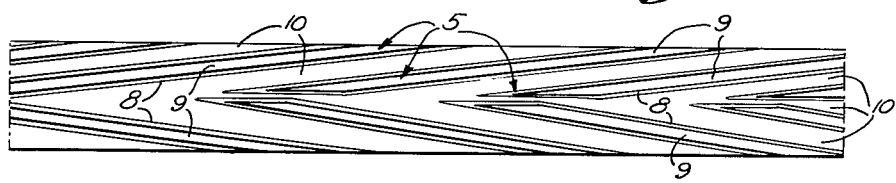
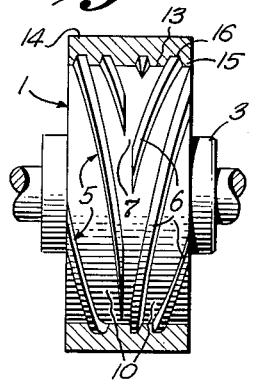
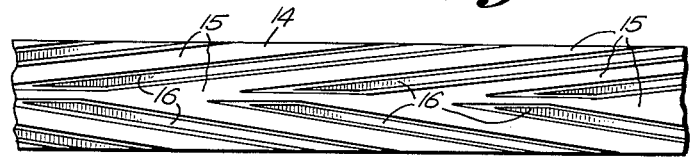
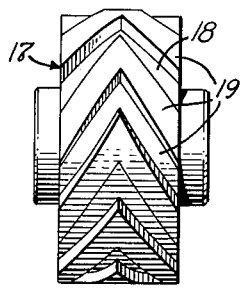
INVENTOR
*Henry G. Colmer, Jr.*
BY
*Mason, Fenwick & Lawrence*
ATTORNEYS

United States Patent Office 3,216,273
Patented Nov. 9, 1965

3,216,273
POWER TRANSMITTING MEANS
Henry G. Colmer, Jr., 4203 Belvedere St., Mobile, Ala.
Filed May 8, 1963, Ser. No. 278,881
4 Claims. (Cl. 74—457)

This invention relates to power transmitting elements, and particularly to improved gears capable of meshing in driving relation with mating gears, or with drive belts, and to combinations of these elements.

The transmission of power, or movement, from one shaft to another, or from one rotatable element to another, has been accomplished through the use of a number of mechanical elements. Trains of meshing gears have been used, the gears being spur gears, bevel gears, helical gears, or combinations of these. In each case, however, meshing gears have to be of the same type. Chains passing around sprockets are employed many times as the transmission means. Here, again, there is a set combination of elements which are usable together. A third means frequently used is the belt drive where a flexible belt is trained over pullies fixed to the driving and driven shafts. Although several of these drive means may be employed in a single machine, there has been no way of utilizing some of the elements of one drive with elements of another; in other words, formerly gears meshed with gears, chains driving sprockets, and belts driving pullies.

The primary object of the present invention is to provide an improved gear which will be capable of meshing with another gear of mating configuration in a gear train, or of positive tracking engagement with a belt.

A more specific object of the invention is to provide an improved gear having a novel arrangement of driving elements about its periphery.

Another object is the provision of such a gear which will have a drive action which is continuous and smooth, with no shock when load is transferred from one element to the next, which reduces wear to an absolute minimum.

A further object is to provide a gear in which backlash is practically eliminated, thus making it possible to use the gear in high ratio transmission and at high velocities.

Yet another object is to provide a gear which will be self cleaning in use.

It is also an object to provide a gear for use with a belt which will cause the belt to be self-centering and eliminate the need for flanges to prevent belt run-off.

Another object is the provision of a gear of this type for use with a belt which will prevent belt stretch from having a material effect upon a preselected drive rate, and wherein belt tension is unimportant.

Still another object of the invention is to provide an improved gear which will be noiseless in operation, whether in mesh with a mating gear or tracking a belt.

Other objects of the invention will become apparent from the following description of practical embodiments thereof, when taken in conjunction with the drawings which accompany, and form part of, this specification.

In the drawings:

FIGURE 1 is a side elevation of the improved gear;

FIGURE 2 is an edge elevation of the gear in mesh with a mating gear, and showing the gear drive element pattern;

FIGURE 3 is a development of the driving face of the gear illustrating the complete drive element pattern;

FIGURE 4 is an edge elevation of the gear showing in section a belt trained about the gear;

FIGURE 5 is a plan view of a section of the belt showing its pattern; and

FIGURE 6 is an edge view of a gear with a slightly modified drive element pattern.

In general, the invention is concerned with a gear which has driving elements on its periphery arranged at an angle to the side faces of the gear, with the driving elements on one side of a centerline through the gear edge being substantially symmetrical but reversed with respect to the elements on the other side of the centerline. The separate elements are in overlapping relation so that driving engagement with one is not released before another is in driving engagement. When the gear is used with a belt, the underside of the belt has a tracking facsimile of the gear edge, but in reverse.

Referring to the drawings in detail, there is shown in FIGURE 1 through 4 an improved gear 1. The gear may have the usual center shaft-opening 2 with a surrounding hub 3. The peripheral edge 4 of the gear is provided with a plurality of driving elements 5 for meshing engagement with a companion gear or a belt.

The working face of the gear, that is the edge 4, is divided into two sections along the center of the face 4. The driving elements 5 are arranged in the two sections in symmetrical fashion, with the elements on the two sections being reversely positioned. Each element is arranged at a small angle to the centerline of the face, and extends from the center outwardly to the outer edge. Consequently, due to the substantial symmetry about the center line, the pairs of adjacent elements diverge from the center of the face outward, forming V-shaped, composite driving members 6. The V-shaped members are arranged in nested fashion, so that the vertex of one member is located between the diverging arms of the next. In the form of gear shown in FIGURES 1 to 4, the drive elements are separated at the vertex of the V-shaped member, as at 7. The elements on one side of the center of face 4 are slightly in advance of those on the other side of the center. The spacing between adjacent driving elements 5 is approximately equal to the width of an element. The cross-sectional shape of the driving elements is not important, so long as they taper from their root 8 to their tip 9. This provides both tapered elements and tapered cavities 10 between the elements, so that the elements and cavities of a companion member, either gear or belt, may freely intermesh with, and release, the gear.

In FIGURE 2, a mating gear 11 is shown in mesh with the gear 1. Gear 11 has a working face 12 which is the reverse of the working face of gear 1. In other words, gear 11 is formed with cavities 13 in the same pattern as the driving elements of the gear 1. When the two gears are meshed, the driving elements 5 of gear 1 fit into the cavities of gear 11 with the inclined contacting faces of the intermeshing elements and cavities providing load bearing surfaces to transmit the drive of one gear to the other. The tapered elements and cavities, together with the incline of the members, provide for smooth rolling transfer of power. There will be no slippage, and practically no bending, or deflection, of the drive elements.

In FIGURE 4, gear 1 is shown used as a pulley, or sprocket, and a belt 14 is trained about the gear. Belt 14 has a patterned underface 15, which is the reverse of the development of the face of gear 1. The pattern appears the same as the development of the gear face, but the belt has cavities 16 in place of the driving elements 5 of the gear. This permits the belt to wrap around the gear with the elements 5 of the gear seating in the cavities 16 in the underface of the belt. This provides for positive engagement of the belt with the gear, and continuous intermeshing tracking as the gear is rotated.

The engagement of mating units constructed in accordance with the present invention will provide positive, powerful driving means. The gears, or gear and belt, will run silently, and practically without wear. The gears can be manufactured inexpensively, as they can be formed on a lathe.

The improved gear and belt drive eliminates the need for flanges to maintain proper belt tracking, for the driving element arrangement causes the belt to be self-centering and the belt cannot run off the gear. Belt elongation will have little effect upon the performance of the drive.

In FIGURE 6 a slightly modified gear 17 is shown. The gear face 18 is provided with driving elements 19 oppositely disposed on opposite sides of the center of the gear face. In this embodiment, elements 19 on opposite sides of the face center are joined and the elements are truly symmetrical on opposite sides of the center. With this arrangement, it is possible for two identical gears to mesh, for the driving elements and the spaces between them can be equal.

While in the above, practical embodiments of the invention have been disclosed, it will be understood that the details of construction shown and described are merely by way of example, and the invention may take other forms within the scope of the appended claims.

What is claimed is:

1. Power transmitting means comprising, a circular body having an annular working face, raised driving elements on the working face, the elements being oppositely arranged on opposite sides of the longitudinal center line of the annular working face, each driving element extending from adjacent the longitudinal center line of the working face spirally to the side edge and lying at a small angle to the side edge of the working face.

2. Power transmitting means comprising, a circular body having an annular working face, raised driving elements on the working face, the elements being oppositely arranged on opposite sides of the longitudinal center line of the annular working face, each driving element lying at a small angle to a side edge of the working face and extending from adjacent the longitudinal center line of the working face to the side edge, the driving elements on one side of the longitudinal center line of the working face being staggered longitudinally of the working face relative to the driving elements on the other side of the longitudinal center line of the working face.

3. Power transmitting means as claimed in claim 2 wherein, there is a second circular body having an annular working face, the working face of the second annular body having recesses arranged therein in duplicate reverse pattern to the driving elements on the working face of the first-mentioned circular body so that the drive elements of the first-mentioned circular body may track in driving relation in the recesses of the second circular body.

4. Power transmitting means as claimed in claim 2 wherein, there is a flexible belt having a working face having recesses therein in a pattern which is the continuous development of the driving elements on the working face of the circular body.

References Cited by the Examiner
UNITED STATES PATENTS

| | | | |
|---|---|---|---|
| 1,814,311 | 7/31 | Harvey | 74—421 |
| 2,091,958 | 9/37 | Braga | 74—229 X |
| 3,117,459 | 1/64 | Schweitzer | 74—229 |

DON A. WAITE, *Primary Examiner.*